Patented Feb. 19, 1952

2,586,438

UNITED STATES PATENT OFFICE 2,586,438

STEROL ESTERS OF NICOTINIC ACID

Hans Reinhard Rosenberg, Bound Brook, N. J., assignor to E. I. du Pont de Nemours & Company, Wilmington, Del., a corporation of Delaware No Drawing. Application June 29, 1949, Serial No. 102,139

8 Claims. (Cl. 260—239.5)

This invention relates to nicotinic acid, and has for its object the production of this vitamin in a form which can be used in the fortification of rice, corn, grits and similar foods.

Nicotinic acid is well known as a vitamin essential for the prevention of pellagra, and has been incorporated for this purpose in many staple, human foods such as wheat flour or bread. In such uses, the vitamin is employed in its simplest chemical form, that is nicotinic acid ar an amide thereof. Both these forms are water-soluble, and are therefore readily incorporated in wheat flour or bread dough.

When grainy foods or cereals are considered, however, such as rice, corn, grits or other foods which are intended to be cooked or washed, the water-soluble forms of the vitamins are no longer applicable, inasmuch as they would be readily lost in the wash-water or cooking fluids. On the other hand, water-insoluble forms of the vitamins are not readily applicable for the reason that in many of them the biological activity of the vitamins is very much diminished, if not entirely destroyed, while some have additional objections such as bad odor.

Thus a series of n-alkyl esters of nicotinic acid have been investigated and reported in the literature, but none were found satisfactory. The lower aliphatic esters proved to be water-soluble to a great extent, some even more so than nicotinic acid itself. In addition, from a practical point of view, the enrichment of cereals with such alkyl nicotinates is objectionable since these compounds are odoriferous, somewhat unstable oils. On the other hand, the reaction products of nicotinamide with p-amino-benzoic acid, phenyl isocyanate and 6-methoxy-8-aminoquinoline were found to have satisfactory insolubility, but hardly any biological activity.

Now, I have found, that nicotinic acid may be transformed into a water-insoluble form without substantially impairing its activity as a vitamin, by converting the same into the ester of a sterol. The sterols, as is well known, are 3-hydroxy-10,13-dimethyl-cyclopentano-perhydro-phenanthrenes bearing an aliphatic hydrocarbon radical in the 17-position. The hydroxyl group in the 3-position is of an alcoholic nature, and forms readily esters wtih nicotinic acid itself, its acid-chloride or an anhydride thereof. Accordingly, this invention may be considered as having as a further principal object the production of novel esters of nicotinic acid, characterized by the general formula

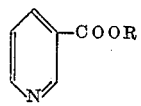

where OR represents the alcohol radical of a sterol.

Any sterol answering the above definition may be employed, but for practical purposes a commonly available sterol is naturally to be preferred. As such commonly available sterols may be named ergosterol, cholesterol, 7-dehydrocholesterol, phytosterol, stigmasterol, the sterols from marine invertebrata, etc.

The synthesis is most readily effected by reacting nicotinic acid chloride with the selected sterol in an organic solvent, for instance an aromatic hydrocarbon in the presence of an organic base, such as pyridine or other tertiary amine. The reaction product may be recovered by extraction with ether, the ether solution being then duly washed and treated to recover therefrom the ester in crystalline form. Another method is to add a lower alcohol to the reaction mass until the sterol nicotinate begins to crystallize.

Without limiting the invention, the following examples are given to illustrate my preferred mode of operation. Parts mentioned are by weight.

Example 1

Twenty-one parts of nicotinic acid are heated in 50 parts of thionylchloride and kept at the reflux temperature for half an hour. The excess thionylchloride is then distilled off, and the mass is cooled. One hundred parts of dry benzene are added together with 34 parts of pyridine. A mixture of 50 parts of cholesterol dissolved in 200 parts of dry benzene is then added while keeping the temperature of the reaction mixture below 20° C. The mixture is agitated overnight at room temperature. The reaction product is then poured on ice-water, extracted with ether, and the ether solution is washed consecutively with dilute alkali, water, dilute acid, and water, until it is neutral, whereupon it is dried over sodium sulphate. The ether solution is then concentrated, and the cholesterol nicotinate is precipitated with methanol. This is filtered off and recrystallized from ethyl acetate. After several recrystallizations, cholesterol nicotinate melts at 152° to 154° C. to a cloudy liquid which becomes clear at 200° C. It is not soluble in water. Its optical rotation $[\alpha]_D$ in chloroform has been found to be —16.2. Its biological activity as a pellagra-preventive has been tested by the dog method described by Elvehjem and coworkers in "The Vitamin Content of Meat" (Burgess Pub. Co., 1941), page 121, and in the J. Biol. Chem., 144, 679 (1942), and found to be substantially the same, mole for mole, as that of nicotinic acid.

Example 2

A mixture of 7 parts of nicotinic acid and 15 parts of thionylchloride is heated on a steam cone for one-half hour. The excess thionylchloride is then distilled off under reduced pressure. A mixture of 27 parts of benzene and 11.3 parts of pyridine is added to the reaction vessel followed by 15 parts of 7-dehydrocholesterol in 63 parts of benzene. The mixture is allowed to stand for 48 hours and is filtered. The filtrate is diluted with ether and the solution is washed respectively with dilute alkali, water, dilute acid, and water. The ether layer is separated and dried over anhydrous sodium sulfate. Removal of the ether gives 7 - dehydrocholesterol nicotinate which, after recrystallization from ethyl acetate, melts at 160° to 162° C. to a cloudy liquid, clearing at 177° to 182° C. It does not dissolve in water. Its optical rotation $[\alpha]_D$ in chloroform has been found to be —55.9.

Example 3

A mixture of 12.3 parts of nicotinic acid and 27 parts of thionylchloride is heated on a steam cone for one-half hour, and the excess thionylchloride is removed under reduced pressure. The residual nicotinyl chloride is suspended in 27 parts of benzene and 18 parts of pyridine. To this mixture is added a solution of 13.9 parts of ergosterol in 63 parts of benzene. The mixture is allowed to stand 18 hours. The reaction product is then filtered into a separator funnel, and the filtrate is diluted with ether. The ether solution is washed respectively with dilute acid, water, dilute alkali, and water. The mass is then dried and the ether is distilled off to give ergosterol nicotinate. This, after crystallization from ethyl acetate, melts at 162° to 166° C., has an optical rotation $[\alpha]_D$ in chloroform of —61.5, and is water-insoluble.

Example 4

A mixture of 42 parts of nicotinic acid and 90 parts of thionylchloride is heated on a steam cone for 45 minutes. The excess thionylchloride is distilled off under reduced pressure. To the residual nicotinyl chloride are added 60 parts of pyridine and 90 parts of phytosterol in 225 parts of benzene. The mixture is shaken and allowed to stand for 18 hours. The mixture is then filtered into a separatory funnel and the filtrate is diluted with ether. The ether solution is washed respectively with dilute acid, water, dilute alkali, and water. It is then dried over anhydrous sodium sulfate. Removal of the ether, gives water-insoluble phytosterol nicotinate, melting at 108° to 116° C. after recrystallization from ethyl acetate.

All the products above have biological activity of the same order (mole for mole) as nicotinic acid.

It will be understood that the above examples are merely illustrative, and that the details thereof may be varied within the skill of those engaged in the art. Thus in lieu of the particular sterol mentioned in each example any other sterol may be employed. In lieu of thionylchloride phosphorus oxychloride or any other acid-halogenating agent may be employed. In lieu of pyridine, other amines may be employed, such as lutidine, collidine, picoline, aniline and N-alkyl derivatives thereof, quinoline, etc.

It is also obvious to those skilled in the art that other methods of esterification are possible, depending upon the form of nicotinic acid selected, for instance the acid chloride, the anhydride, an ester, or the free acid itself.

I claim as my invention:
1. A sterol ester of nicotinic acid.
2. The ester of cholesterol and nicotinic acid.
3. The ester of phytosterol and nicotinic acid.
4. The ester of nicotinic acid and 7-dehydrocholesterol.
5. The method of transforming nicotinic acid into a water-insoluble form without substantially impairing its biological activity, which comprises converting the same into the ester of a sterol.
6. The method of transforming nicotinic acid into a water-insoluble form without substantially impairing its biological activity, which comprises converting the same into the ester of cholesterol.
7. The method of transforming nicotinic acid into a water-insoluble form without substantially impairing its biological activity, which comprises converting the same into the ester of phytosterol.
8. The method of transforming nicotinic acid into a water-insoluble form without substantially impairing its biological activity, which comprises converting the same into the ester of 7-dehydrocholesterol.

HANS REINHARD ROSENBERG.

REFERENCES CITED

The following references are of record in the file of this patent:

UNITED STATES PATENTS

| Number | Name | Date |
| --- | --- | --- |
| 2,296,677 | Kussner | Sept. 22, 1942 |
| 2,359,413 | Freedman | Oct. 3, 1944 |
| 2,456,363 | Bergel et al. | Dec. 14, 1948 |

OTHER REFERENCES

Page et al., Biochem. Zeitschrift, vol. 220 (1930) pp. 312–323 (complete article, pp. 304–326).

Steldt et al., Chem. Abstracts, vol. 39 (1945), p. 348.

Bodgett et al., Jour. Amer. Chem. Soc., vol. 67 (1945), pp. 1135–1138.

Charonnat, Bull. Soc. Chim. France 1948, 1014–1017.